Nov. 1, 1955  D. C. ECKENBECK ET AL  2,722,259
INSERT NUT WITH BALL SHAPED PLATE ENGAGING EXTENSION
Filed Nov. 1, 1950

*INVENTORS.*
DANA C. ECKENBECK
PHILIP E. SLAUGHTER
CHARLES L. MADDEN
BY H. F. Woodward
atty.

United States Patent Office 2,722,259
Patented Nov. 1, 1955

2,722,259

INSERT NUT WITH BALL SHAPED PLATE ENGAGING EXTENSION

Dana C. Eckenbeck, Philip E. Slaughter, and Charles L. Madden, Minneapolis, Minn.

Application November 1, 1950, Serial No. 193,506

13 Claims. (Cl. 151—41.73)

This invention relates to improvements in inserts adapted to be applied to plates, castings and the like; to provide secure fastening means for bolts and/or other members and elements.

In the manufacture and fabrication of various structures, particularly those comprising parts composed of relatively thin and/or soft materials, difficulties are often encountered in supplying such structures with secure fastening, for example, tie-bolts. Among these difficulties is the difficulty frequently met in threading a bolt receiving hole in a plate or the like in which a worker has been able to drill with comparative ease. Another difficulty resides in the relative weakness of fastenings threaded in a threaded hole, where the hole is formed in a relatively thin and/or soft material. A still further difficulty resides in the frequent necessity of providing bosses on relatively thin and/or soft plate and castings to supply sufficient material in the bolt fastening threads to meet the contemplated strain upon the bolt.

Another object of the present invention is to provide simple, durable and inexpensive inserts or fastening means which are adapted to be readily applied to the work and which efficiently overcomes the various difficulties frequently met in applying nuts to relatively thin and/or soft plates and the like.

With the foregoing and other objects in view, which will appear in the following specification, the invention resides in the novel combination and arrangement of parts and/or the details of construction hereinafter described and claimed.

Figure 1:
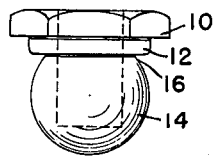
Figure 1 is a view illustrating a form of plug-insert in embodiment of the invention, the same being shown in elevation.

The plug insert is designed so that the ball or substantially curved shaped lip can be easily inserted into a straight hole. The plug insert may be seated in the hole by various means, for example, driven by force, seated by kick or power press, and in some form pulled home by a bolt or mating part.

When seated, the plug-nut becomes fixed in the work so that a bolt or other securing means may be removed and re-inserted at will. The tapered lip may be of greater depth than the thickness of the plate material in which the nut is seated. Since the plug insert does not need a wrench to hold it during assembly with a bolt, it may be furnished with or without a head or with round as well as hexagonal head. The plug insert has been successfully applied to cast aluminum, to aluminum alloy, to brass sheets and rods, to plastics, cast iron, cast steel and other materials. The plug insert has been used in connection with a material with a thickness not greater than .022 inch.

Under dynamic and static loads, the plug insert is substantially stronger than standard or other accepted nut forms. The curved or tapered lip of the insert being always in tension helps to fill the gap between the tensile strain of a bolt and the compressive load of the nut. This strength factor also exists and increases when the bolt is stretched.

The insert takes advantage of the strength of the material into which it is inserted to provide cross-sectional strength. The strength in tension and the realized stretching of the bolt produces a stronger fastening than that heretofore known.

In some instances the use of the new insert permits the lightening of the material now used where present thickness is determined not by load bearing but rather by tapping requirements.

The curved portion of the insert may be considered a specific form of frusto-conical form. The specific form shown has an advantage in thin material. The insert shown in the drawings has the entering end smaller than the diameter of the hole and the size of the body above the entering end of a size larger than the diameter of the hole into which the insert is to be seated. The insert body is of greater resistance to compressive deformation than the material of the plate about the hole is to expansive deformation.

It is to be understood that the insert shown in each figure of the drawing is provided with an axial bore which may be threaded for the reception of a mating member; but it is to be further understood that for certain usages the bore need not be threaded.

The insert is to be used with a plate and the like having a substantially straight hole therein. The term "straight hole," used herein, means a drilled, punched or otherwise formed hole having the transverse cross-sectional dimensions substantially uniform.

For the purpose of this application, there has been set forth certain structures and arrangements, but it is to be understood that they are here presented for illustrative purposes only and are not to be accorded any interpretation such as might have the effect of limiting what is claimed as the invention short of its true and comprehensive scope in the art.

In Figure 1, the insert is provided with a head 10 and directly below the head is platform 12 which will be imbedded in the plate material, causing the metal of the plate to flow against the body of the insert, the tapered body 14, and there is provided an undercut recess into which the material of the plate flows upon enforced seating in a straight walled hole, thus staking the insert in the work. The material of the plate also flows against the body of the insert during seating.

Figure 2:
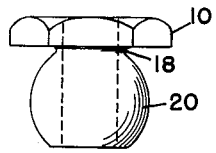
Figure 2 is an elevational view of a ball shaped insert without the platform shown in Figure 1.

In Figure 2 is shown a form of insert in which the head 10 is secured to the substantially ball shaped portion 20 so that an undercut recess 18 is provided. In this form of insert the metal or other flowable material of the plate moves against the outer surface of the insert, thereby securely anchoring it in the work.

Figure 3:
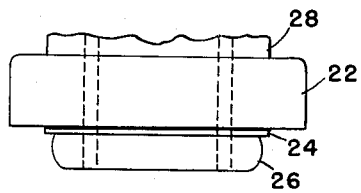
Figure 3 is an elevational view with parts broken away of a fastener with the insert portion.

In Figure 3 is shown a ball nut which includes head portion 22, platform portion 12 adjacent the head, and ball portion 26. Extending above the head is neck portion 28 with part broken away. The enforced seating of the ball portion and the platform portion results in the metal or other flowable material of the plate about a hole flowing over the surface sufficient to hold the insert securely to the plate.

Figure 4:
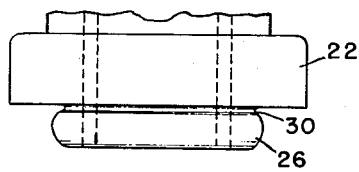
Figure 4 is a view of an insert similar to that shown in Figure 3 but with an undercut and without a platform.

Figure 4 shows an insert similar to that shown in Figure 3, but there is provided an undercut recess 30 adjacent the head in place of the platform.

It is to be understood that the shape of the insert body, at least a portion therof, may be substantially spherical, substantially conoidal, or may be a polygon of infinite number of sides with the entering end smaller than the body portion above the entering end. The insert will perform satisfactorily where a portion of the outer surface is substantially curved.

Figure 5:
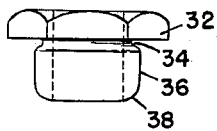
Figure 5 is an elevational view of plug insert before knurling.

In Figure 5 an insert is provided with a head 32, undercut recess 34, a relatively straight portion 36 and curved lower end portion 38. This insert is then knurled as at 40, resulting in the substantially curved plug section.

Figure 6:
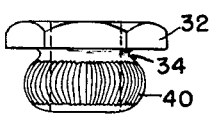
Figure 6 is a view of the plug insert shown in Figure 5 after knurling.

Figure 6 shows an insert having a non-compressible shank adapted to be secured in a cylindrical aperture in a plate and having a threaded bore extending along the axis of the shank, said shank having an outer convex arcuate surface of revolution and having end portions with diameters less than that of said aperture and a major diameter larger than that of said aperture disposed substantially midway between said end portions, said convex arcuate surface having a radius of curvature longitudinally of the shank less than the radius of the major diameter of the shank, and the convex portion of the shank being knurled, and the insert having a head on one end of the shank with a surface thereof disposed substantially perpendicular to said axis and engageable with one face of the plate.

Figure 7:
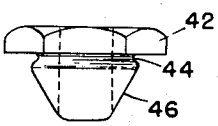
Figure 7 is a modified form of plug insert before knurling.
Figure 8:
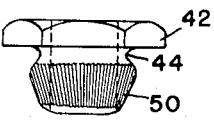
Figure 8 is a view of plug insert of Figure 7 after knurling.
Figure 9:
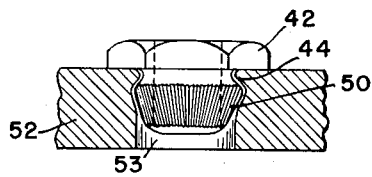
Figure 9 is a view illustrating a ball shaped insert; the same being shown in elevation; said view further illustrating a cross section portion of a plate with a drilled hole therein in which is seated the plug insert.

The plug, before knurling, may be in the form shown in Figure 7. The body portion 46 is tapered before knurling with an undercut of 44 below the head 42. After knurling, the body portion 46 takes the shape as shown in Figure 8 at 50.

When the insert is applied to a plate 52, the small entering end guides the body portion 50 into the hole 53, and then proceeding with the seating of the insert in the hole 53, the material of the plate 52 is deformed substantially around the hole. Upon seating of the insert body in the hole 53, substantially and circumferentially deformation of the plate material about the hole will be produced and a gripping action effected thereby between the plate and insert sufficiently strong alone to hold the insert firmly and securely in the plate.

This application is a continuation in part of our application Serial No. 714,974, filed December 9, 1946, now Patent No. 2,544,304.

What is claimed:

1. In combination, a plate having a substantially straight walled hole therein, an insert having a head and a substantially continuous spherical outer section portion and having the free end of a size substantially equal to but of less diameter than the diameter of the hole in the plate, a bore in the insert formed to receive a mating member, the head of the insert being larger than the major diameter of the spherical outer portion, said insert being of greater resistance to compressive deformation than the material of the plate about the hole is to expansive deformation, the resistance of the curved portion of the insert to deformation being such that upon enforced seating of the insert in the hole, substantial deformation of the plate material about the hole will be produced and the plate material flow over the outer surface of the insert.

2. In combination, a plate having a hole of substantially uniform transverse cross-sectional dimension therein, an insert having a substantially continuous curved shaped outer portion with substantially the mid-section of the substantially curved outer portion of greatest diameter and having an end of a size substantially equal to but less diameter than the diameter of the hole in the plate, the insert having a head of greater width than the largest diameter of the curved shaped outer portion and the head spaced apart from larger diameter, the insert machined to receive a mating member, said insert being of greater resistance to compressive deformation than the material of the plate about the hole is to expansive deformation, the resistance of the curved portion of the insert to deformation being such that upon enforced seating substantial deformation of the plate material about the hole will be produced, and a gripping action effected thereby between the plate and insert sufficiently strong alone to hold the insert firmly and securely in the plate.

3. In combination, a plate having a substantially straight walled hole therein, an insert having a head and a substantially ball shaped portion, the larger diameter of the ball shaped portion being of greater diameter than the diameter of the hole, the said head greater in width than the largest diameter of the said ball, a threaded bore in the insert for receiving a mating member, the ball-shaped portion being of greater resistance to compressive deformation than the material of the plate to expansive deformation, the resistance of the ball-shaped portion being such that upon enforced seating in the hole, substantial deformation of the plate material about the hole will be produced, thereby effecting a gripping action between the insert and the plate.

4. In combination, a metallic plate having a substantially straight walled hole therein, an insert having a head, a curved body portion of substantially ball-shape below the head and of a diameter less than the width of the head, thereby providing an undercut recess between the head and the curved body portion, the curved body portion knurled, the bore in the insert machined to receive a mating member, the resistance of the curved portion to deformation being such that upon enforced seating of the insert the material of the plate about the hole will be deformed and a gripping action effected between the insert and the plate sufficiently strong alone to hold the insert firmly and securely in the plate.

5. In combination, a plate having a hole of substantially uniform transverse cross-sectional dimensions therein, an insert having head and a continuous outer surface portion a part of which is curved outwardly from one end to form a substantially ball-shaped portion, the end below the outwardly curved portion of a diameter less than the diameter of the hole, the said head being of greater width than the largest diameter of the ball-shaped portion, the insert formed for receiving a mating member, the insert of greater resistance to compressive deformation than the plate to expansive deformation, that upon enforced seating of the insert the material of the plate will be produced without substantial deformation of the insert.

6. In combination, a plate of flowable material having a substantially straight walled hole therein, an insert having a head and a continuous outer surface portion, a part of which is substantially shaped as a polygon with infinite number of sides with substantially the mid part of the polygon-shaped portion of greatest diameter with an entering end of a diameter less than the diameter of the hole, the insert formed for receiving a mating member, the said head spaced apart from the greatest diameter and of a width greater than the greatest diameter of the polygon shaped-portion, said insert being of greater resistance to compressive deformation than the material of the plate to expansive deformation, the resistance of the polygon-shaped portion being such that upon enforced seating of the insert in the hole, substantial deformation of the plate material about the hole will be produced and a gripping action effected between the insert and the plate.

7. In combination, a plate of flowable material having a substantially straight walled hole therein, an insert having a head and a substantially spherical outer section portion and having the free end flat and in a plane parallel to the head and of a size substantially equal to but of less diameter than the diameter of the hole in the plate, the spherical portion knurled, the head spaced apart from the largest diameter of the spherical outer spaced portion and of a width greater than the spherical portion, a bore in the insert threaded to receive a mating member, said insert being of greater resistance to compressive deformation than the material of the plate about the hole is to expansive deformation, the resistance of the curved portion of the insert to deformation being such that upon enforced seating of the insert in the hole, substantial deformation of the plate material about the hole will be produced and the plate material flow over the outer surface of the insert.

8. In combination, a plate of flowable material having a substantially straight walled hole therein, an insert having a head and a substantially ball-shaped portion, the larger diameter of the ball-shaped portion being of greater diameter than the diameter of the hole, the ball-shaped portion knurled, a threaded bore in the insert for receiving a mating member, the head spaced apart from larger diameter of the ball-shaped portion and of a greater width than the larger diameter, the ball-shaped portion being of greater resistance to compressive deformation than the material of the plate to expansive deformation, the resistance of the ball-shaped portion being such that upon enforced seating in the hole substantial deformation of the plate material about the hole will be produced, thereby effecting a gripping action between the insert and the plate.

9. In combination, a plate of flowable material having a hole of substantially uniform cross-sectional dimensions therein, an insert having a head and a depending body with a free end, said body having the largest diameter between two small diameters, and the body being substantially continuously curved between the smaller diameters with one of the smaller diameters in a plane adjacent the free end and with the smaller diameter adjacent the free end substantially equal to but less than the diameter of the said hole in the plate of flowable material, the body portion of the insert having serrations therein, said body portion extending outwardly from the small diameter adjacent the free end to substantially the largest diameter, the head adjacent one of the smaller diameters and of a width greater than the largest diameter, the insert formed to receive a mating member, the resistance of the outwardly extending portion to compressive deformation being greater than the plate to expansive deformation, the resistance of the outwardly extending portion being such that upon enforced seating substantial deformation of the plate material about the hole will be produced and the flow of plate material against the body portion of the insert will be effected sufficiently strong alone to hold the insert firmly in the plate.

10. In combination, a plate having a hole of substantially uniform transverse cross-sectional dimensions therein, an insert having a head and a platform and a substantially continuous outer surface portion, a part of which is curved outwardly from one end to form a substantially ball-shaped portion, the platform adjacent the head and of a width not less than the greatest diameter of the substantially ball-shaped portion and the said head of a width greater than the said platform, the ball-shaped portion knurled, the end below the outwardly curved portion of a diameter substantially equal to but less than the diameter of the hole, the insert formed for receiving a thread member, the insert of greater resistance to compressive deformation than the plate to expansive deformation so that upon enforced seating of the insert the material of the plate will be deformed without substantial deformation of the insert.

11. An insert comprising a member, a non-compressible shank on said member adapted to be secured in a cylindrical hole in a plate and having a convex arcuate surface of revolution with the major diameter thereof disposed substantially centrally of the end portions of said shank, a plurality of longitudinal extending grooves in the convex portion of said shank, and a shoulder formed on said member engageable with said plate to limit the movement of said shank into said aperture, said insert having a threaded aperture extending through said shank and said longitudinal grooves extending substantially parallel to the axis of the threaded aperture.

12. An insert comprising a member, a non-compressible shank on said member adapted to be secured in a cylindrical aperture in a plate and having end portions with diameters less than that of said aperture and having an intermediate convex arcuate portion substantially midway between said end portions with a diameter larger than that of said aperture and with surfaces sloping from said larger diameter to said smaller diameters, said shank being knurled to provide grooves only in the convex portion directed toward opposite ends of said shank, and a shoulder formed on said member engageable with said plate to limit the movement of said shank into said aperture, said insert having a threaded aperture extending through said shank and said longitudinal grooves extending substantially parallel to the axis of the threaded aperture.

13. An insert having a non-compressible shank adapted to be secured in a cylindrical aperture in a plate and having a threaded bore extending along the axis of said shank, said shank having an outer convex arcuate surface of revolution and having end portions with diameters less than that of said aperture and a major diameter larger than that of said aperture disposed substantially midway between said end portions, said convex arcuate surface having a radius curvature longitudinally of the shank less than the radius of the major diameter of the shank, and the convex portion of said shank being knurled, and a head on one end of said shank having a surface thereof disposed substantially perpendicular to said axis and engageable with one face of the plate.

References Cited in the file of this patent

UNITED STATES PATENTS

| | | |
|---|---|---|
| 97,260 | Wickersham | Nov. 23, 1869 |
| 786,725 | Bruce | Apr. 4, 1905 |
| 1,199,031 | Smith | Sept. 19, 1916 |
| 1,294,995 | Williams | Feb. 18, 1919 |
| 1,714,520 | Sande | May 28, 1929 |
| 1,996,795 | Dodge | Apr. 9, 1935 |
| 2,008,229 | Sharp | July 16, 1935 |
| 2,172,553 | Tripp | Sept. 12, 1939 |
| 2,434,832 | Bruun | Jan. 20, 1948 |
| 2,544,304 | Eckenbeck et al. | Mar. 6, 1951 |

FOREIGN PATENTS

| | | |
|---|---|---|
| 134,157 | Great Britain | Oct. 30, 1919 |